US 10,518,611 B2

(12) United States Patent
Murasawa et al.

(10) Patent No.: US 10,518,611 B2
(45) Date of Patent: Dec. 31, 2019

(54) POWER SLIDE WINDOW

(71) Applicant: Yachiyo Industry Co., Ltd., Saitama (JP)

(72) Inventors: Akira Murasawa, Utsunomiya (JP); Tatsuaki Uehara, Tokyo (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 16/327,469

(22) PCT Filed: Jul. 20, 2017

(86) PCT No.: PCT/JP2017/026333
§ 371 (c)(1),
(2) Date: Feb. 22, 2019

(87) PCT Pub. No.: WO2018/047476
PCT Pub. Date: Mar. 15, 2018

(65) Prior Publication Data
US 2019/0184793 A1    Jun. 20, 2019

(30) Foreign Application Priority Data

Sep. 9, 2016 (JP) .................................. 2016-176716

(51) Int. Cl.
*B60J 1/18*      (2006.01)
*E05F 15/662*    (2015.01)
(Continued)

(52) U.S. Cl.
CPC ............. *B60J 1/1853* (2013.01); *E05F 11/53* (2013.01); *E05F 11/535* (2013.01);
(Continued)

(58) Field of Classification Search
CPC ...... E05F 11/535; E05F 15/638; E05F 15/646; E05F 11/53; E05F 15/662; B60J 1/1853
See application file for complete search history.

(56) References Cited

U.S. PATENT DOCUMENTS

| 4,534,233 A | 8/1985 | Hamaguchi |
| 5,069,502 A | 12/1991 | Sekine et al. |

(Continued)

FOREIGN PATENT DOCUMENTS

| FR | 2385870 | 10/1978 |
| JP | S59195982 | 11/1984 |

(Continued)

OTHER PUBLICATIONS

International Search Report for PCT/JP2017/026333 dated Sep. 13, 2017, 4 pages.

*Primary Examiner* — Catherine A Kelly
(74) *Attorney, Agent, or Firm* — Dority & Manning, P.A.

(57) ABSTRACT

Provided is a power slide window which can synchronize the winding and unwinding movements of the upper drive cables and the lower drive cables, and can be assembled with ease. The power slide window (1) includes an upper drive cable (10U) connected to an upper part of the slide panel and extending from the slide panel in a lateral direction along a surface of the window glass pane, a lower drive cable (10D) connected to a lower part of the slide panel and extending from the slide panel in the lateral direction along the surface of the window glass pane, a first pulley (40) configured to be rotatably driven by the drive source to wind and unwind the upper drive cable, a second pulley (50) configured to be rotatably driven by the drive source to wind and unwind the lower drive cable, and a coupling structure (60) provided between the first pulley and the second pulley to allow the (Continued)

first pulley and the second pulley to be joined to each other at a selected relative angular relationship.

6 Claims, 9 Drawing Sheets

(51) Int. Cl.
- *E05F 11/53* (2006.01)
- *E05F 15/638* (2015.01)
- *E05F 15/646* (2015.01)

(52) U.S. Cl.
CPC .......... *E05F 15/638* (2015.01); *E05F 15/646* (2015.01); *E05F 15/662* (2015.01); *E05Y 2201/654* (2013.01); *E05Y 2201/684* (2013.01); *E05Y 2900/55* (2013.01)

(56) References Cited

U.S. PATENT DOCUMENTS

| | | | | |
|---|---|---|---|---|
| 5,542,214 A * | 8/1996 | Buening | ................ | B60J 1/16 49/127 |
| 5,613,323 A * | 3/1997 | Buening | ................ | B60J 1/16 49/130 |
| 5,799,444 A * | 9/1998 | Freimark | ............... | B60J 1/1853 49/209 |
| 5,836,110 A * | 11/1998 | Buening | ................ | B60J 1/16 49/360 |
| 6,052,946 A * | 4/2000 | Isomura | ................ | B60J 1/17 49/332 |
| 7,219,470 B2 * | 5/2007 | Lahnala | ................ | B60J 1/1853 16/95 R |
| 7,437,852 B2 * | 10/2008 | Dufour | ................ | E05F 11/535 49/213 |
| 7,464,501 B2 * | 12/2008 | Arimoto | ............... | E05F 15/646 49/209 |
| 7,509,773 B2 * | 3/2009 | Vornbaumen | ......... | E05F 11/423 49/209 |
| 7,568,312 B2 * | 8/2009 | Dufour | .................. | B60J 1/1853 49/216 |
| 7,584,574 B2 * | 9/2009 | Kinross | .................. | B60J 1/1853 49/209 |
| 7,641,265 B2 * | 1/2010 | Seiple | .................... | B60J 1/1853 296/190.1 |
| 8,469,437 B2 * | 6/2013 | Zanetti | ................ | E05F 15/1047 296/146.16 |
| 8,474,186 B2 * | 7/2013 | Dufour | .................. | B60J 1/1853 49/380 |
| 8,562,063 B2 * | 10/2013 | Giret | .......................... | B60J 1/16 296/146.15 |
| 8,578,654 B2 * | 11/2013 | Rao | ....................... | E05F 11/535 49/209 |
| 8,769,872 B2 * | 7/2014 | Maltaverne | ................ | B60J 1/16 49/209 |
| 8,813,425 B2 * | 8/2014 | Ash, Jr. | ................... | E05F 15/00 49/380 |
| 9,027,282 B2 * | 5/2015 | Schreiner | ............ | E05D 15/0608 49/210 |
| 9,487,065 B2 * | 11/2016 | Bender | ................ | E05F 11/525 |
| 2002/0148163 A1 * | 10/2002 | Warner | ............... | E05D 15/0652 49/209 |
| 2007/0277442 A1 * | 12/2007 | Dery | .......................... | B60J 1/16 49/362 |
| 2012/0091113 A1 | 4/2012 | Bennett et al. | | |
| 2017/0254131 A1 * | 9/2017 | Otsubo | .................... | E05D 15/10 |
| 2019/0184793 A1 * | 6/2019 | Murasawa | ............... | E05F 11/53 |
| 2019/0194992 A1 * | 6/2019 | Murasawa | ................ | B60J 1/18 |

FOREIGN PATENT DOCUMENTS

| | | |
|---|---|---|
| JP | H10100668 | 4/1998 |
| JP | H10159438 | 6/1998 |

\* cited by examiner

POWER SLIDE WINDOW

TECHNICAL FIELD

The present invention relates to a power slide window for selectively closing an opening formed in a window glass pane with a slide panel that can be slidably driven by a drive source.

BACKGROUND ART

A power slide window that selectively closes an opening formed in a window glass pane with a slide panel by slidably driving a slide panel with an electric motor is known. In a conventional power slide window, a rightwardly extending cable and a leftwardly extending cable are connected to a lower end of a slide panel which is supported on a window glass pane so as to be slidable in the lateral direction along a panel surface of the window glass pane, and these cables are wound and unwound, respectively, by a pulley rotatively driven by an electric motor so that the slide panel is slidably driven. In this power slide window, the two cables are wound and unwound by two pulleys provided independently in the cable drive device.

PRIOR ART DOCUMENT(S)

Patent Document(s)

Patent Document 1: US2012/0091113A

SUMMARY OF THE INVENTION

Task to be Accomplished by the Invention

However, this conventional power slide window allows the slide panel to be slid only in a direction parallel to the panel surface along which the cable extends. For example, it is conceivable to slide the slide panel also in a direction crossing the panel surface by using a cam mechanism. However, in order to smoothly slide the slide panel while involving such a complex action, it is necessary to connect two additional cables extending in the right and left direction, respectively, to upper parts of the slide panel, such that the slide panel is driven by a total of four upper and lower cables. In such an arrangement, four pulleys will be required to wind and unwind the four cables.

It is conceivable to pass the two cables around a single pulley so that the two cables may be respectively wound and unwound simultaneously. By using such a structure, the four cables may be wound and unwound as required by using two pulleys, one for winding and unwinding the upper cable pair and the other for winding and unwinding the lower cable pair. However, in order to synchronize the winding and unwinding movements of the upper cables and the lower cables, the two pulleys are required to be joined integrally to each other. Also, joining the two pulleys while properly setting the numbers of turns of the upper cables and the lower cables that are wound around the respective two pulleys at the time of assembly requires a fine adjustment of the relative rotational angle of the two pulleys so that the assembly process becomes highly complex.

In view of such a problem of the prior art, a primary object of the present invention is to provide a power slide window which can synchronize the winding and unwinding movements of the upper and lower drive cables, and can be assembled with ease.

Means for Accomplishing the Task

To achieve such an object, the present invention provides a power slide window (1), comprising a window glass pane (2) having an opening (2a) formed therein; a slide panel (3) slidably provided on the window glass pane so as to open and close the opening, a drive source (5) for slidingly driving the slide panel, an upper drive cable (10U) connected to an upper part of the slide panel and extending from the slide panel in a lateral direction along a panel surface of the window glass pane, a lower drive cable (10D) connected to a lower part of the slide panel and extending from the slide panel in the lateral direction along the panel surface of the window glass pane, a first pulley (40) configured to be rotatably driven by the drive source to wind and unwind the upper drive cable, a second pulley (50) configured to be rotatably driven by the drive source to wind and unwind the lower drive cable, and a coupling structure (60) configured to join the first pulley and the second pulley to each other at a relative angular relationship selected at a time of assembly.

Owing to this structure, the first pulley and the second pulley can be coupled to each other with the coupling structure after adjusting the relative rotational angle to a desired value. Therefore, the winding and unwinding movements of the upper drive cable and the lower drive cable can be synchronized, and the assembly work is facilitated.

Preferably, in this structure, the coupling structure (60) includes a recess (53) formed in an end surface of one of the first pulley and the second pulley (50), the recess having a plurality of axial grooves (54) formed on an inner circumferential surface thereof, and a protrusion (45) protruding from an end surface of another of the first pulley and the second pulley (40) in a complementary relationship to the recess, the protrusion having a plurality of projections (46) formed on an outer circumferential surface thereof and configured to be received by the respective grooves.

Thereby, the relative rotational angle between the first pulley and the second pulley can be adjusted by using a simple structure.

Preferably, in this structure, the first pulley (40) and the second pulley (50) are disposed coaxially to an output shaft (35) of the drive source (5).

Thereby, the power slide window can be formed as a compact unit.

Preferably, in this structure, the first pulley (40) or the second pulley (50) is configured to be coupled to the output shaft (35) of the drive source (5) at a relative angular relationship selected at a time of assembly.

Thereby, the first pulley or the second pulley can be adjusted to a desired relative rotational angle and then coupled to the output shaft. Therefore, the assembling work is facilitated.

Preferably, in this structure, the other of the first pulley and the second pulley (40) is provided with a recess (43) formed in an end surface thereof, the recess having a plurality of axial grooves (44) formed on an inner circumferential surface thereof, and the output shaft (35) of the drive source (5) has a shape complementary to the recess and is provided with a plurality of projections (36) formed on an outer circumferential surface thereof and configured to be received by the respective grooves.

Thereby, the relative rotational angle between the first pulley or the second pulley and the output shaft can be adjusted by using a simple structure.

Preferably, in this structure, the upper drive cable (10U) includes a pair of upper cables (10UL, 10UR), and the lower drive cable includes a pair of lower cables (10DL, 10DR), the upper cables and the lower cables being each provided with one end (10a) connected to a corresponding lateral end of the slide panel (3), and another end (10b) connected to a corresponding one of the first pulley and the second pulley, wherein the first pulley is configured to wind and unwind the two upper cables in a mutually complementary manner while the second pulley is configured to wind and unwind the two lower cables in a mutually complementary manner.

Thereby, the slide panel can be slidably driven smoothly in the opening direction and the closing direction by using the two pulleys. In addition, since the cable does not slip with respect to the pulley, there is no need to assemble the drive cable while applying a tension thereto, and the assembly work is facilitated.

Preferably, the slide panel (3) is slidably guided in the lateral direction along the panel surface of the window glass pane (2) and in a fore and aft direction crossing the panel surface of the window glass pane.

Since the slide panel can be positioned within the opening of the window glass pane, and the unevenness of the panel surface of the window glass pane can be minimized, the commercial acceptability of the power slide window can be improved by improving the aesthetic appearance thereof.

Effect of the Invention

Thus, the present invention provides a power slide window which can synchronize the winding and unwinding movements of the upper and lower drive cables, and can be assembled with ease.

DESCRIPTION OF THE PREFERRED EMBODIMENT(S)

A preferred embodiment of the present invention is described in the following with reference to the appended drawings. The fore and aft, and up and down directions mentioned in the following description are based on the state where the power slide window 1 is mounted on a vehicle, and the right and left directions are based on the view point of a vehicle occupant viewing the power slide window 1 rearward from a front part of the cabin of the vehicle. The front and rear sides may be referred to as inboard side and outboard side with respect to the cabin. The similar components which are arranged in vertically opposing pairs are denoted with numerals with a different suffix U or D appended thereto depending on if the particular component is located in an upper part or in a lower part. The similar components which are arranged in laterally opposing pairs are denoted with numerals with a different suffix R or L appended thereto depending on if the particular component is located in a right part or in a left part. When such components are collectively referred to or when no distinction is required if the particular component is located in an upper part or a lower part, or on a left hand side or a right hand side, the suffix is omitted from the numeral indicating each particular component.

Figure 1:
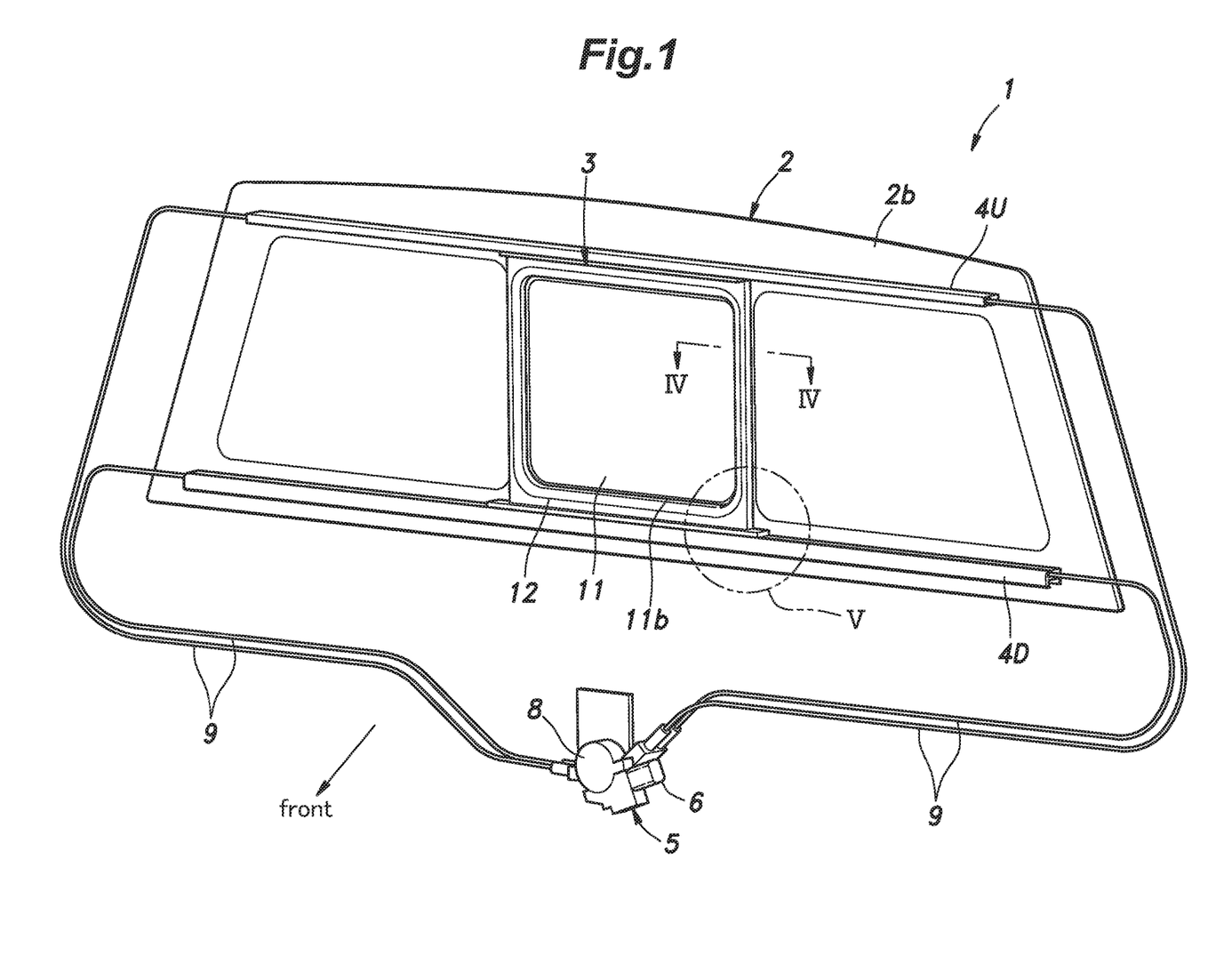
FIG. 1 is a perspective view of an overall structure of a power slide window according to an embodiment of the present invention in a closed state.

FIG. 1 is a perspective view of an overall structure of a power slide window 1 for a vehicle according to an embodiment of the present invention in a closed state as viewed from an upper front part of a passenger compartment of the vehicle. This power slide window 1 is fitted on a rear end of a cabin of a pickup truck as a rear window, and includes a window glass pane 2. The window glass pane 2 extends substantially vertically with the panel surface (major plane) thereof facing in a fore and aft direction, and is provided with a laterally elongated substantially rectangular shape such that the lateral dimension along the panel surface is greater than the vertical dimension along the panel surface. A rectangular opening 2a (FIG. 2) is formed in a central part of the window glass pane 2, and a rectangular slide panel 3 is provided on the window glass pane 2 so as to close the opening 2a. The outer periphery and the inner periphery around the opening 2a of the window glass pane 2 are formed with light shielding portions 2c on the front surface thereof by applying a light shielding treatment or by applying a paint containing black pigment (black ceramic coating).

Figure 2:
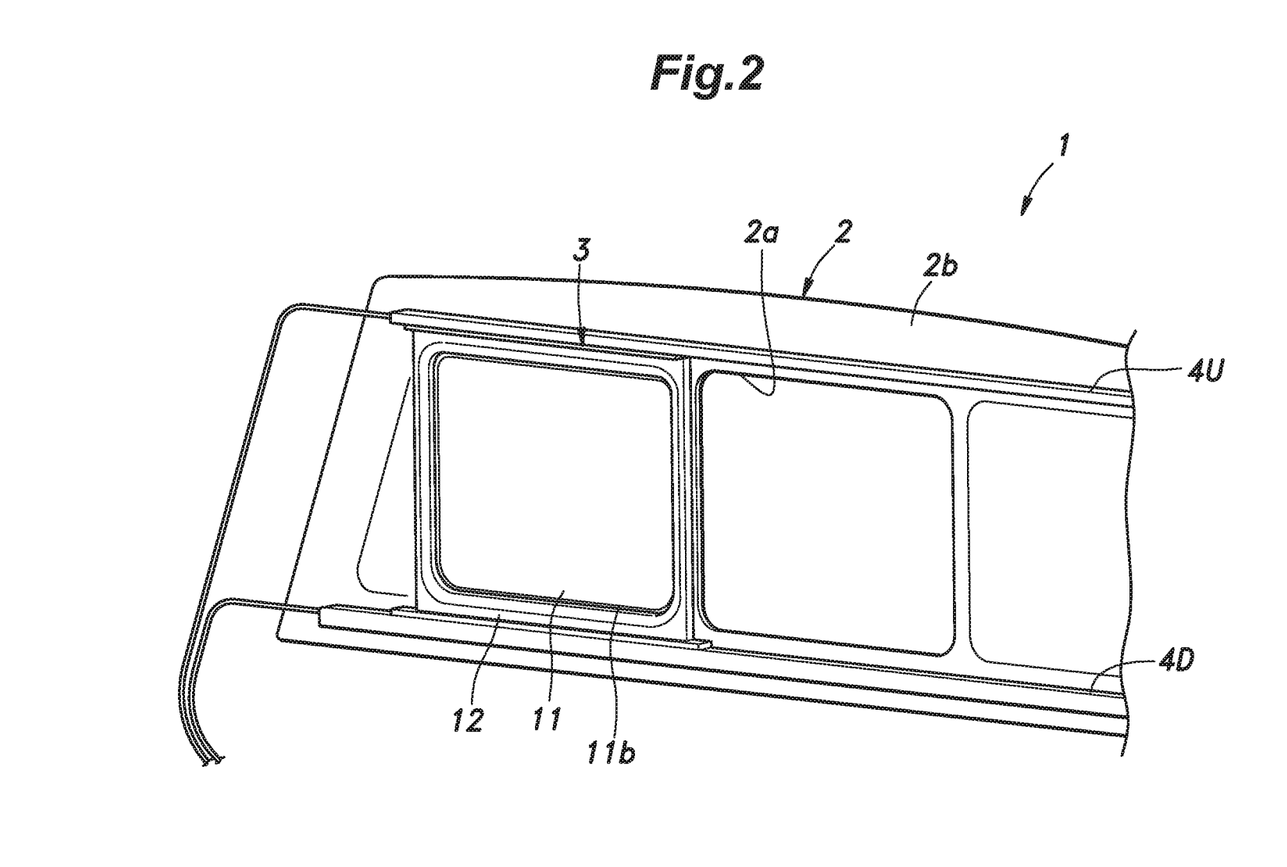
FIG. 2 is a fragmentary perspective view of the power slide window shown in FIG. 1 in a closed state.

An upper and lower guide rail 4 (4U and 4D) extending laterally and horizontally in parallel to each other are attached to the corresponding light shielding portions 2b of the window glass pane 2. In particular, the slide panel 3 is configured to be slidable in the lateral direction along the upper and lower guide rails 4. In the present embodiment, the slide panel 3 is configured to selectively open and close the opening 2a by sliding between a closed position in which the opening 2a is closed as shown in FIG. 1, and an open position in which the opening 2a is opened by sliding from the closed position to the left as shown in FIG. 2. In an alternate embodiment, the slide panel 3 is configured to slide to the right from the closed position to open the opening 2a. It is also possible to arrange such that the slide panel 3 is slidable in either lateral direction from the closed position thereof so that the opening 2a may be opened by sliding the slide panel 3 in either lateral direction from the closed position.

As shown in FIG. 1, a drive source 5 for slidingly driving the slide panel 3 is provided in a part of the vehicle body located under the window glass pane 2. The drive source 5 includes an electric motor 6, a speed reduction mechanism 7 (see FIG. 7), and a housing 8 that houses the speed reduction mechanism 7, and is fixedly attached to the vehicle body via the housing 8. Four guide pipes 9 are connected to the housing 8. The two guide pipes 9 located on the right side extend rightward from the housing 8, and are then curved upward before being connected to the upper and lower guide rails 4U and 4D, respectively, from the right side. The two guide pipes 9 located on the left side extend leftward from the housing 8, and are then curved upward before being connected to the upper and lower guide rails 4U and 4D, respectively, from the left side.

The two guide pipes 9 connected to the upper guide rail 4U are connected to a relatively front part (outboard part) of the housing 8, and the two guide pipes 9 connected to the lower guide rail 4D are connected to a relatively rear part (inboard part) of the housing 8. The guide pipes 9 slidably receive therein cables 10 (10DL, 10DR, 10UL and 10UR; see FIG. 3) for slidingly driving the slide panel 3 by transmitting the drive force of the drive source 5. The upper cable 10UR on the right side and the upper cable 10UL on the left side are complementarily wound and unwound (or paid out) by a common pulley (the first pulley 40 shown in FIG. 7). Similarly, the lower cable 10DR on the right side and the lower cable 10DL on the left side are complementarily wound and unwound (or paid out) by another common pulley (the second pulley 50 shown in FIG. 7).

Figure 3:
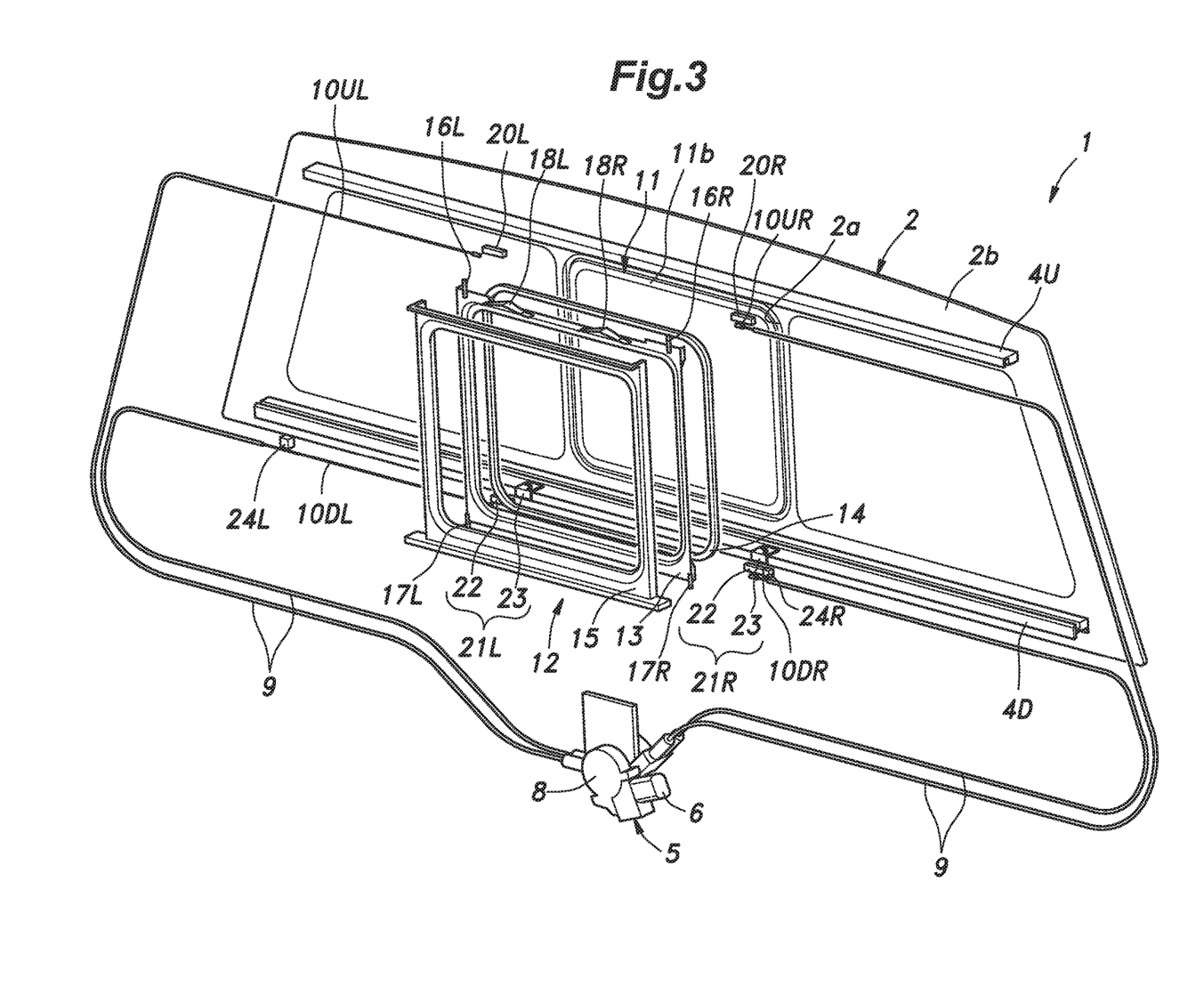
FIG. 3 is an exploded perspective view of the power slide window shown in FIG. 1.
Figure 4:
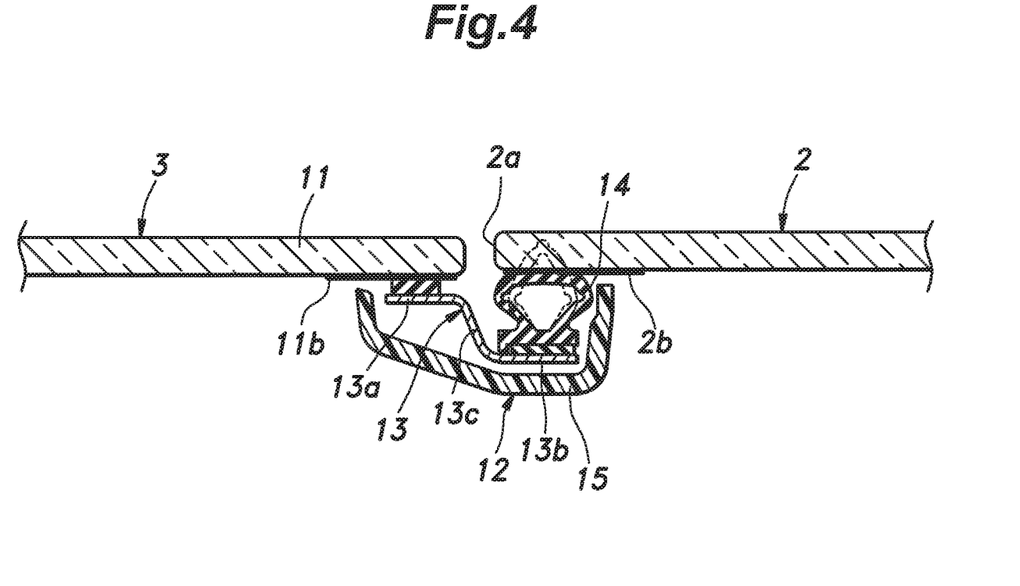
FIG. 4 is a sectional view taken along line IV-IV of FIG. 1.

FIG. 3 is an exploded perspective view of the power slide window 1 shown in FIG. 1. FIG. 4 is a sectional view taken along line IV-IV of FIG. 1. As shown in FIGS. 3 and 4, the slide panel 3 includes a movable glass pane 11 having the same thickness as the window glass pane 2, and a frame 12 provided on the periphery of the movable glass pane 11. The movable glass pane 11 is formed somewhat smaller than the opening 2a of the window glass pane 2, and is arranged parallel to the window glass pane 2 in the opening 2a so as to be flush with the window glass pane 2. The periphery of the movable glass pane 11 is formed with a light shielding portion 11b by applying a light shielding treatment or by applying of a paint containing black pigment (black ceramic coating).

The frame 12 includes a bracket frame 13 joined to the inner surface of the light shielding portion 11b of the movable glass pane 11 via an adhesive. The bracket frame 13 is provided with a rectangular annular shape having an inner contour smaller than the outer contour of the movable glass pane 11 and an outer contour larger than the outer contour of the movable glass pane 11. As shown in FIG. 4, the bracket frame 13 includes an inner portion 13a opposing the movable glass pane 11 at a position relatively close to the inner surface of the movable glass pane 11, and an outer portion 13b opposing the window glass pane 2 (which is flush with the inner surface of the movable glass pane 11) at a position relatively remote from the inner surface of the window glass pane 2, and an intermediate portion 13c connecting the inner portion 13a and the outer portion 13b with each other. Thus, the bracket frame 13 is provided with a crank-shaped cross section.

An annular seal member 14 having a hollow cross-sectional shape is attached to the outer surface (rear surface) of the outer portion 13b of the bracket frame 13 by using an adhesive agent. The seal member 14 is made of an elastic material having a low elastic modulus such as synthetic rubber. When no external force is applied, the seal member 14 has a height greater than the distance from the bracket frame 13 to the inner surface of the window glass pane 2 as shown by the imaginary line in FIG. 4. When the movable glass pane 11 is flush with the window glass pane 2, the seal member 14 is elastically deformed so as to reduce its height as indicated by the solid line in FIG. 3, and the distal end thereof resiliently abuts the inner surface of the window glass pane 2. Thereby, the sealing between the movable glass pane 11 and the window glass pane 2 is ensured.

An inboard side (front side) of the bracket frame 13 is fitted with an annular cover frame 15 that covers the seal member 14 and the bracket frame 13. The cover frame 15 is fixed to the bracket frame 13 at appropriate positions thereof. Thus, the frame 12 including the bracket frame 13, the seal member 14 and the cover frame 15 is provided on the cabin side (front side) of the movable glass pane 11, and extends over the light shielding portion 11b of the movable glass pane 11 and the light shielding portion 2b of the window glass pane 2. As a result, the gap between the peripheral edge of the movable glass pane 11 and the opening edge of the window glass pane 2 is covered by the frame 12 from the cabin side over the entire periphery.

As shown in FIG. 3, a right upper pin 16R and a left upper pin 16L integrally project upward from the left and right end portions of the upper part of the bracket frame 13, respectively. A right lower pin 17R and a left lower pin 17L integrally project downward from the left and right end portions of the lower part of the bracket frame 13. Further, a pair upper leaf springs 18 (18L, 18R) are provided on the upper surface of the upper part of the bracket frame 13. The leaf springs 18 resiliently contact the lower surface of the upper guide rail 4U to urge the bracket frame 13 downward, and slide along the lower surface of the upper guide rail 4U as the bracket frame 13 slides.

A left upper slider 20L and a right upper slider 20R are slidably provided on the upper guide rail 4U, and a left lower slider 21L and a right lower slider 21R are slidably provided on the lower guide rail 4D. The left and right upper sliders 20 and the left and right lower sliders 21 are each provided with a shaft member 22 extending along the corresponding guide rail 4, a plate member 23 integrally connected to the shaft member 22 and extending horizontally (only the lower two of them are shown in the drawings). Each shaft member 22 is connected to an end of the corresponding one of the four cables 10 for slidingly driving the slide panel 3. Each plate member 23 engages the corresponding one of the upper pins 16 and the lower pins 17. In other words, the four cables 10 are connected to the left and right end portions of the upper and lower portions of the slide panel 3 via the left and right upper sliders 20 and the left and right lower sliders 21.

The left ends of the upper and lower guide rails 4U, 4D are each provided with a left stopper 24L (only the lower side left stopper is shown in the drawings) made of elastic material to limit the leftward movement of the slide panel 3 at the open position thereof by engaging the left upper slider 20L or the left lower slider 21L, as the case may be. The right ends of the upper and lower guide rails 4U, 4D are each provided with a right stopper 24R (only the lower side right stopper is shown in the drawings) made of elastic material to limit the rightward movement of the slide panel 3 at the open position thereof by engaging the upper slider 20R or the lower slider 21R, as the case may be.

Figure 5:
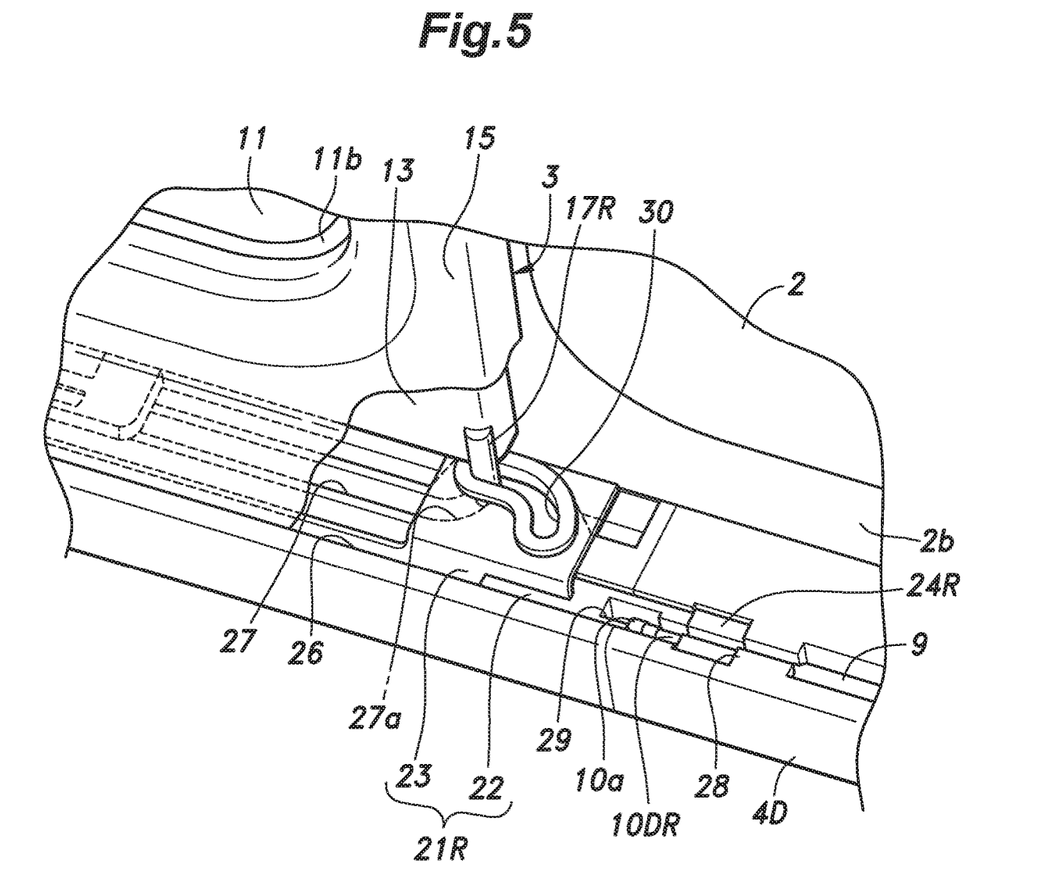
FIG. 5 is a fragmentary perspective view of a part indicated by V in FIG. 1.

FIG. 5 is an enlarged view of a part indicated by V in FIG. 1. The four connecting portions where the slide panel 3 is connected to the four ends of the cables 10 via the left and right upper sliders 20 and the left and right lower sliders 21 are essentially identical in structure. Therefore, only the structure of the connecting portion via the right lower slider 21R is discussed in the following.

As shown in FIG. 5, the lower guide rail 4D is provided with a linear slider guide groove 26 slidably receiving the lower slider 21R and a pin guide groove 27 receiving and guiding the lower pin 17R. The right stopper 24R is provided in the slider guide groove 26, and is supported by a support wall 28 projecting from the slider guide groove 26. The corresponding guide pipe 9 is received in a part of the slider guide groove 26 to the right of the support wall 28. The distal end of the guide pipe 9 abuts against the support wall 28, and the right lower cable 10DR extending from the distal end of the guide pipe 9 reaches the right lower slider 21R via a groove formed in the support wall 28 and the right stopper 24R. The terminal end of the right lower cable 10DR is provided with a first engaging end portion 10a having an enlarged diameter. A second engaging end portion 10b (FIG.

Figure 9:
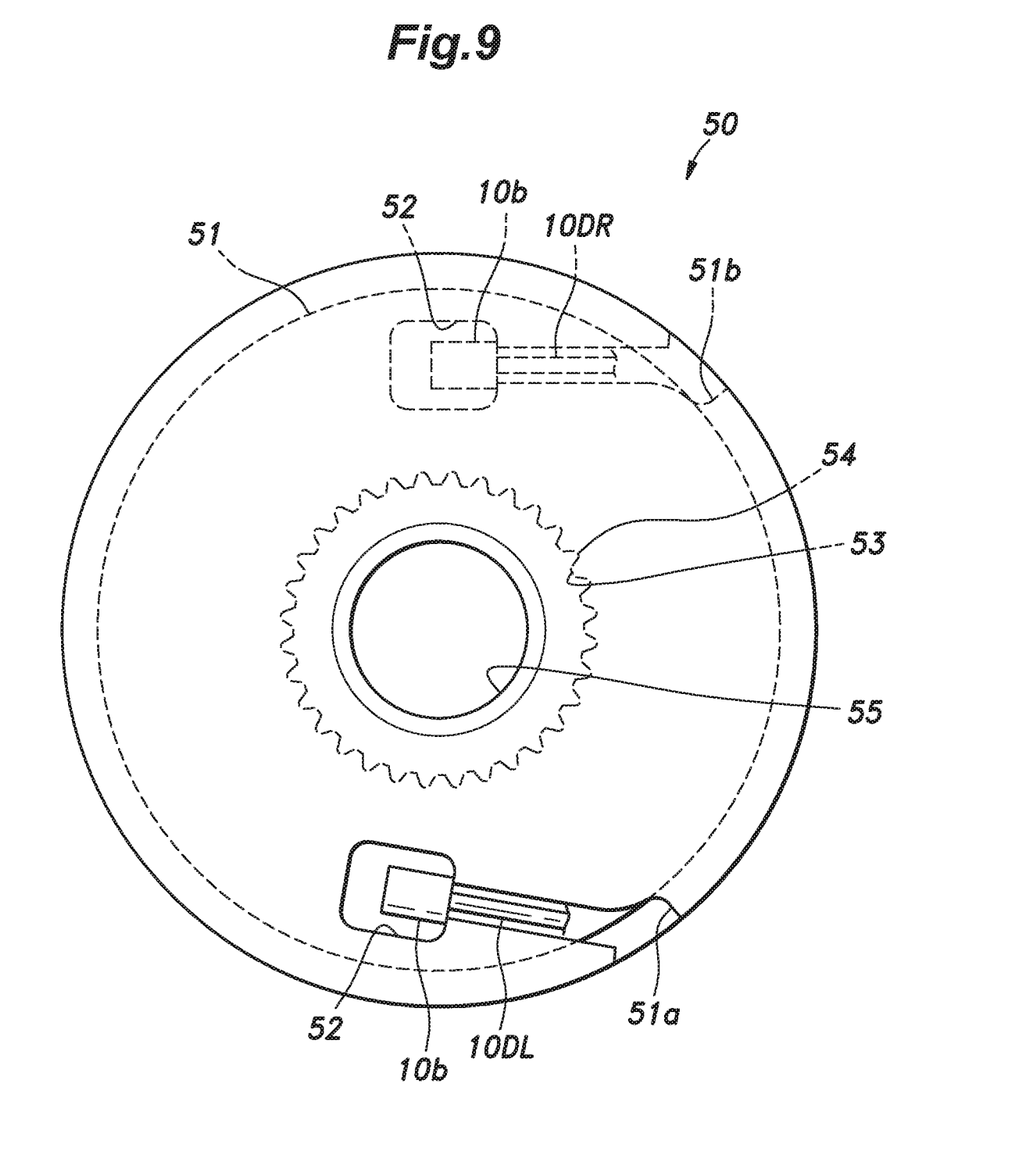
FIG. 9 is a rear view of a second pulley shown in FIG. 7.

9) having an enlarged diameter is formed at the terminal end opposite to the first engaging end portion 10a of the right lower cable 10DR. The pin guide groove 27 extends laterally in both directions along the lower guide rail 4D. The pin guide groove 27 is inclined rearward in the right end part thereof along a curved path as one moves rightward to define a cam groove portion 27a for guiding the right lower pin 17R. A similarly shaped cam groove portion 27a (FIG. 6) for guiding the left lower pin 17L is formed so as to branch out from an intermediate part of the pin guide groove 27.

The shaft member 22 of the right lower slider 21R is formed with a cable holding groove 29 which opens to the upper surface thereof and reaches the right end thereof. The cable holding groove 29 is provided with a greater cross section in the left side part thereof than in the right side part thereof. The cross section of the right side part of the cable holding groove 29 is dimensioned such that the main body portion of the cable 10 can pass through the cable holding groove 29, but the first engaging end portion 10a cannot pass through the cable holding groove 29. The right lower cable 10DR is inserted into the cable holding groove 29 from above, and extends rightward from the right end of the right lower slider 21R while the first engaging end portion 10a is received in the left side portion of the cable holding groove 29, and is engaged therein. Similarly, as shown in FIG. 3, the left lower cable 10DL extends leftward from the left end of the left lower slider 21L, the left upper cable 10UL extends leftward from the left end of the left upper slider 20L, and the right upper cable 10UR extends rightward from the right end of the right upper slider 20R.

Returning to FIG. 5 to continue the description, the plate member 23 of the right lower slider 21R is provided with an elongated slot 30 through which the right lower pin 17 projects into the pin guide groove 27. The slot 30 extends in the lateral direction in the rear part of the plate member 23, and is inclined forward along a curved path so as to extend forward as one moves toward the right end side. In the state shown in FIG. 5 in which the slide panel 3 is in the closed position, the right lower pin 17 is positioned at the left end of the slot 30 of the plate member 23 and at the right end (the rear end of the cam groove portion 27a) of the pin guide groove 27.

As described above, the lower cable 10DR on the right side and the lower cable 10DL on the left side which are wound on and unwound from the same pulley in a complemental manner constitute a lower drive cable 10D that slidingly drives the lower portion of the slide panel 3. Similarly, the upper cable 10UR on the right side and the upper cable 10UL on the left side which are wound on and unwound from the same pulley in a complemental manner constitute an upper drive cable 10U that slidingly drives the upper portion of the slide panel 3.

Figure 6:
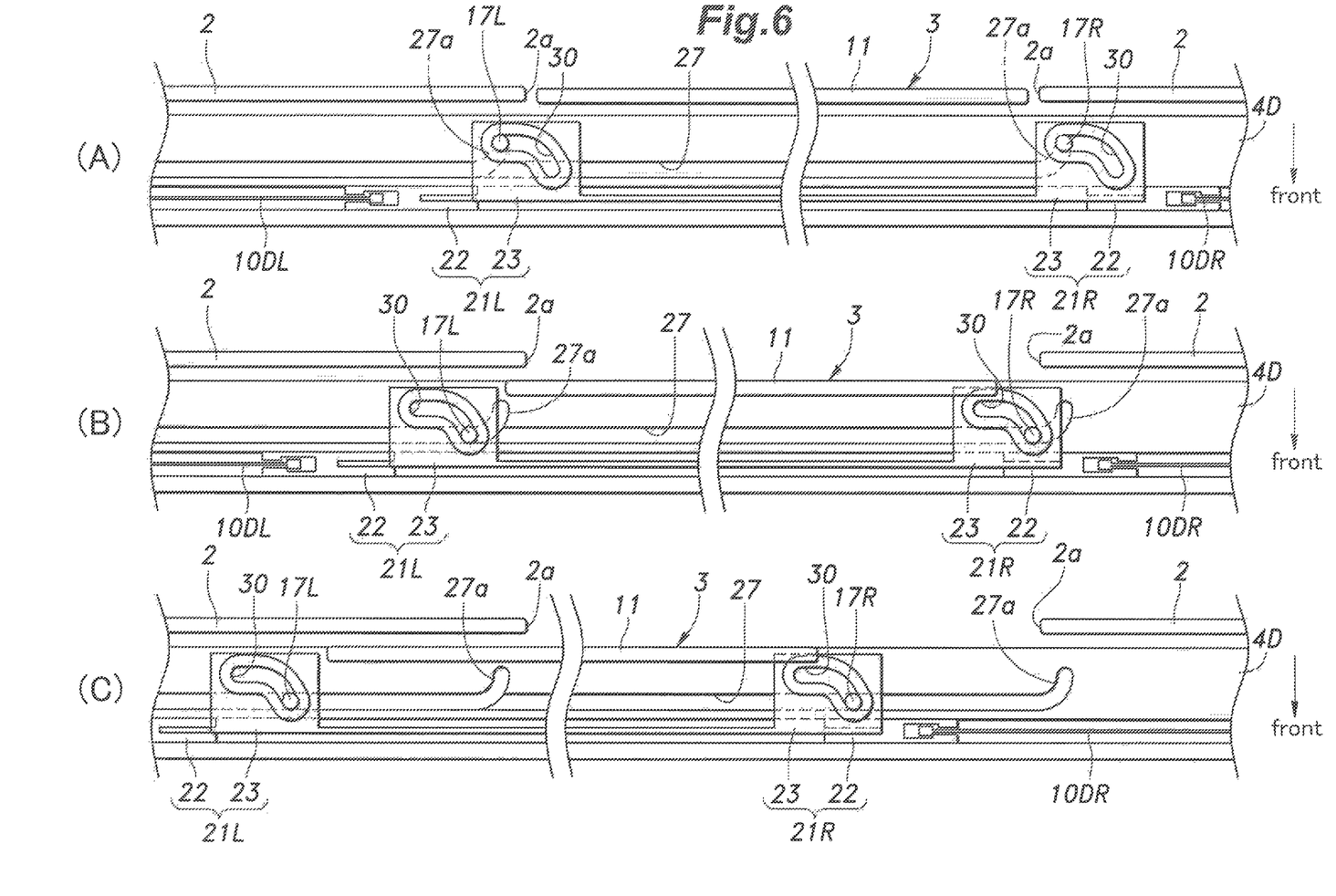
FIG. 6 is a diagram illustrating the mode of an opening and closing movement of the power slide window.

FIG. 6 is an explanatory diagram of the opening and closing operation of the power slide window 1, in which (A) shows the state where the slide panel 3 is in the closed position, (B) shows the state where the slide panel 3 has been slid forward from the closed position, and (C) shows the state where the slide panel 3 in the most forward and leftward position. When the slide panel 3 is to be opened, the state of the power slide window 1 progresses from (A) to (C). Conversely, when the slide panel 3 is to be closed, the state of the power slide window 1 progresses from (C) to (A). In the following description, the operation of the lower portion of the slide panel 3 will be described, and the various components are denoted with the reference numerals for lower portion of the slide panel 3 in FIG. 6. The operation of the upper portion of the slide panel 3 is performed in a similar manner.

As shown in FIG. 6(A), when the slide panel 3 is in the closed position and flush with the window glass pane 2, the left and right lower pins 17L and 17R are each positioned at the left end of the corresponding elongated slot 30 of the plate member 23, and is located at the front end of the corresponding cam groove portion 27a of the pin guide groove 27. Under this condition, when the lower drive cable 10D (10DL, 10DR) is complementarily wound and unwound in the leftward direction, and the left and right lower sliders 21 (21L, 21R) are slidingly driven to the left, the left and right lower pins 17L and 17R are driven forward by the corresponding elongated slots 30, and are at the same time moved forward and leftward along the cam groove portion 27a of the pin guide groove 27 as shown in FIG. 6 (B). As a result, the entire slide panel 3 undergoes a sliding movement such that the window glass pane 2 moves initially forward (in a direction crossing the panel surface) and then leftward (in a direction parallel with the panel surface) while maintaining an attitude in parallel with the panel surface. In the state shown in FIG. 6 (B), the rear surface of the movable glass pane 11 is positioned ahead of the front surface of the window glass pane 2.

Thereafter, when the lower drive cable 10D is complementarily wound and unwound in the leftward direction, and the left and right lower sliders 21 are slid to the left, as shown in FIG. 6(C), the left and right lower pins 17L and 17R move to the left along the pin guide groove 27 while being positioned at the front ends of the corresponding elongated slots 30, respectively. As a result, the entire slide panel 3 slides to the left. The open position of the slide panel 3 is defined at a position where the opening 2a of the window glass pane 2 is fully opened. In this way, by forming the elongated slot 30 elongated in the fore and aft direction in the plate member 23, the slide panel 3 can be moved in the fore and aft direction without causing a change in the fore and aft positions of the shaft member 22 and the lower drive cable 10D.

When the slide panel 3 is in the open position, the lower drive cable 10D is complementarily wound and unwound so as to cause the lower drive cable 10D to be moved rightward, and the left and right lower sliders 21 are slidingly driven to the right, the state shown in FIG. 6 (A) is restored via the state shown in FIG. 6 (B). At this time, the left lower pin 17L located at the position shown in FIG. 6 (B) is conducted to the cam groove portion 27a from the junction between the rightwardly extending pin guide groove 27 and the rearwardly curving cam groove portion 27a. The reason for this is explained in the following.

The cam groove portion 27a is inclined so as to guide the lower pin 17 in a rearward direction as the lower pin 17 moves rightward owing to the rightward movement of the lower slider 21. The elongated slot 30 of the plate member 23 extends in the fore and aft direction to allow the fore and aft movement of the lower pin 17, and is inclined so as to apply a force containing a rearward component to the lower pin 17 when the lower slider 21 moves to the right (in a direction to slide the lower pin 17 rearward). Therefore, when the lower slider 21 moves to the right, not only the right lower pin 17R is driven rearward by the right cam groove portion 27a but also, at the same time, the left and right plate members 23 are moved to the right by the left and right lower pins 17L and 17R, respectively. As a result, as the lower slider 21 moves rightward, the lower pin 17L on the left side is guided in the rearward direction by the elongated slot 30 on the left side, and is guided by the cam groove portion 27a. Thus, the transition from the lateral sliding movement to the fore and aft movement by the slide panel 3 can be accomplished in a smooth manner. In an alternate arrangement, the left side part of the pin guide groove 27 for guiding the left lower pin 17L is formed deeper than the right side part of the pin guide groove 27, and the left lower pin 17L is longer than the right lower pin 17R so that a similar action may be accomplished.

The upper drive cable 10U is wound and unwound in synchronism and complementarily with the lower drive cable 10D. As a result, the upper part of the slide panel 3 is also driven in the fore and aft direction and the lateral direction by moving the left and right upper pins 16 (FIG. 3) along the pin guide groove 27 of the upper guide rail 4U. In this way, the left and right upper cables 10UL and 10UR are complementarily wound and unwound by the same pulley, and in synchronism with this, the left and right lower cables 10DL and 10DR are wound and unwound complementarily by the same pulley so that the slide panel 3 is slidably driven smoothly in the opening direction and the closing direction.

Figure 7:
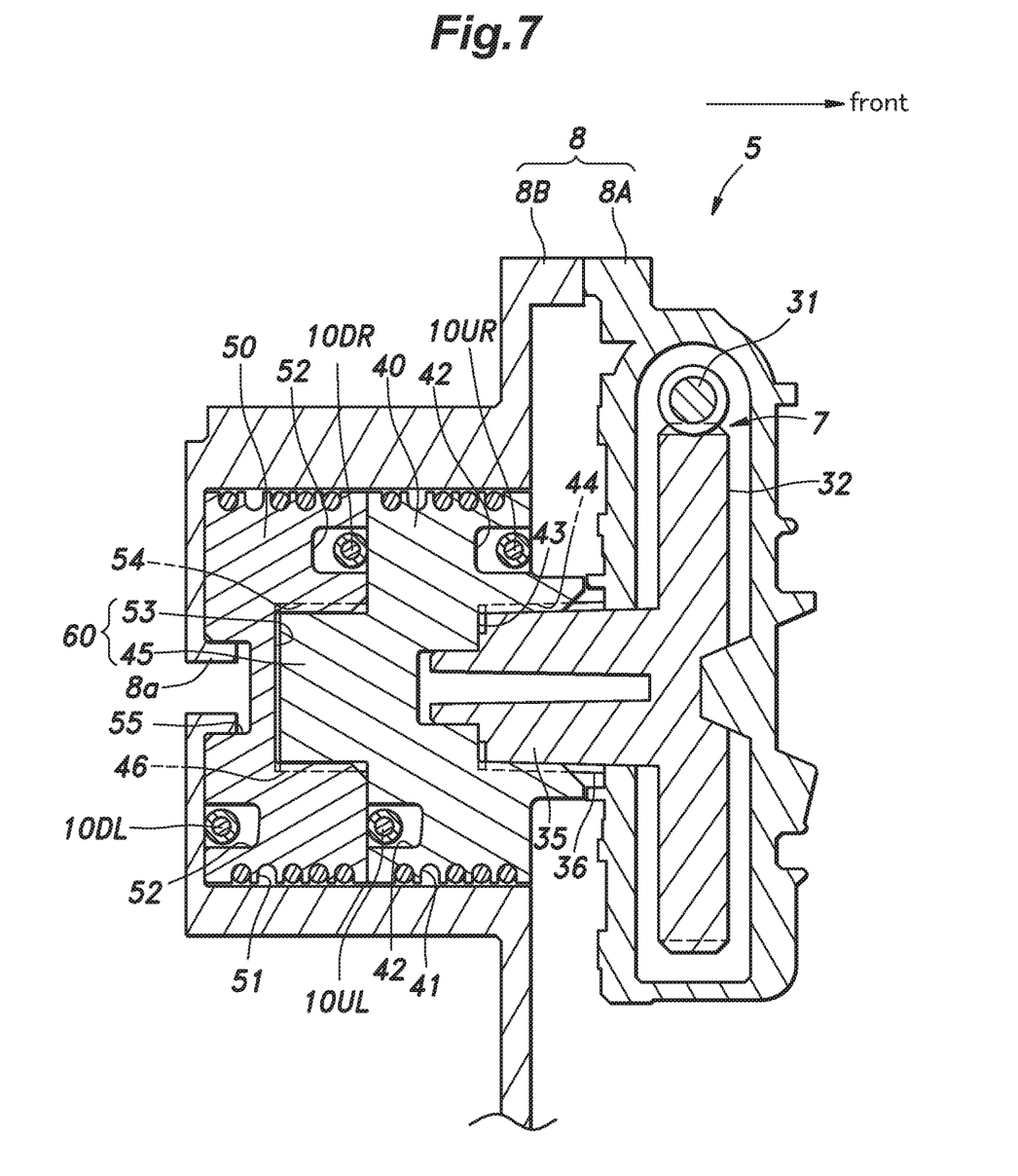
FIG. 7 is a sectional view of a drive source shown in FIG. 1.

The structure of the drive source 5 for the lower drive cable 10D and the upper drive cable 10U, which are wound and unwound in synchronism as discussed above, is described in the following. FIG. 7 is a cross sectional view of the drive source 5 shown in FIG. 1 taken along the center of the output shaft 35. As shown in FIG. 7, a worm 31 (screw gear) is provided on the output shaft of the electric motor 6 (FIG. 1). A worm wheel 32 (helical gear) journaled by the housing 8 and having a rotational center line directed in the fore and aft direction meshes with the worm 31. The output shaft 35 of the drive source 5 projecting rearward along the rotational center line is integrally formed on the worm wheel 32. The worm 31 and the worm wheel 32 jointly constitute the speed reduction mechanism 7.

The first pulley 40 fitted coaxially on the output shaft 35 is directly coupled to a rear end part of the output shaft 35 of the drive source 5. A second pulley 50 disposed coaxially with the output shaft 35 of the drive source 5 is directly coupled to a rear end part of the first pulley 40. The housing 8 includes a front housing 8A that houses the speed reduction mechanism 7, and a rear housing 8B coupled to the rear face of the front housing 8A and accommodating the first pulley 40 and the second pulley 50 therein. The output shaft 35 protrudes rearward from the rear face of the front housing 8A. The rear housing 8B is coupled to the rear face of the front housing 8A after the first pulley 40 and the second pulley 50 are coupled to the output shaft 35.

Figure 8:
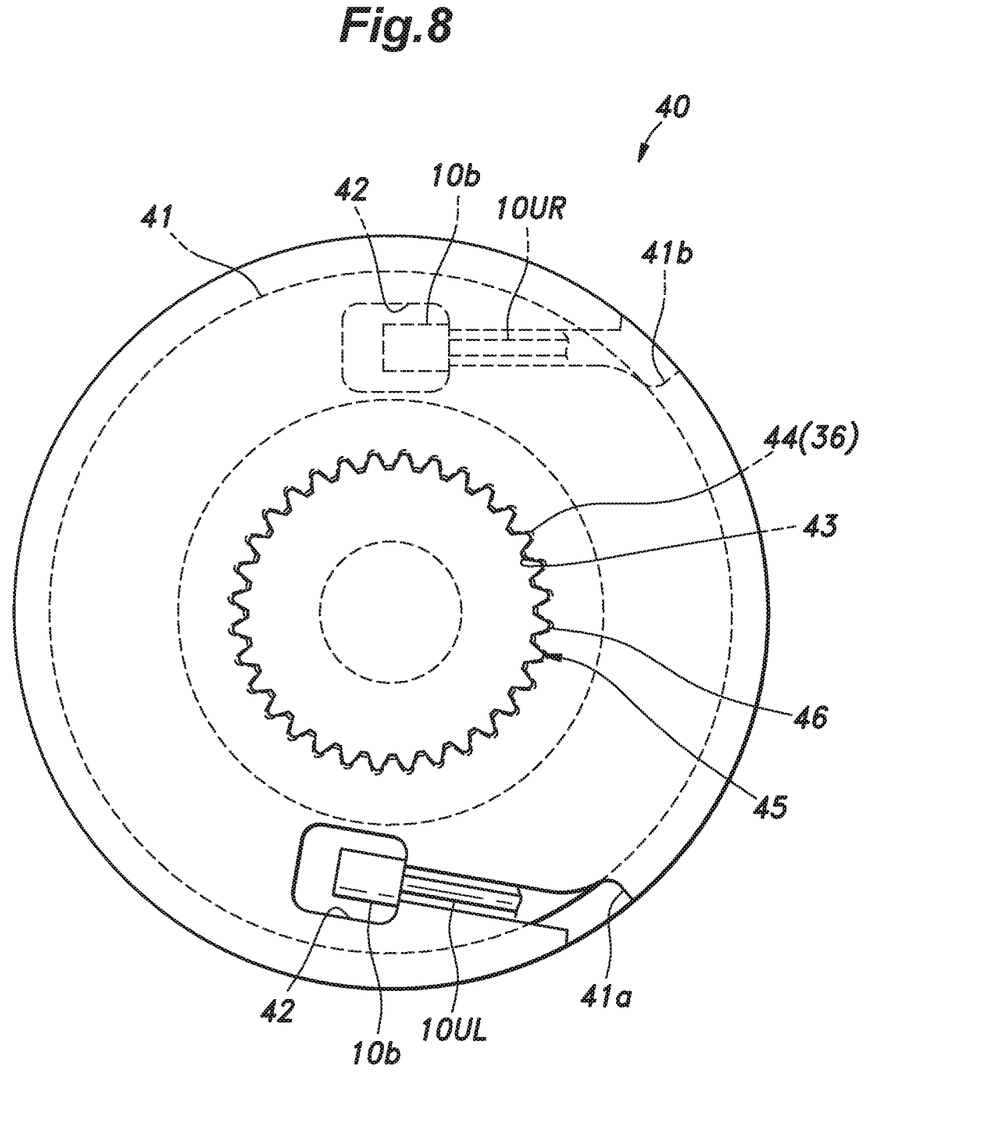
FIG. 8 is a front view of a first pulley shown in FIG. 7.

FIG. 8 is a rear view of the first pulley 40 shown in FIG. 7 as viewed from the rear or from a mounting side. As shown in FIGS. 7 and 8, a single first helical groove 41 is formed on the outer peripheral surface of the first pulley 40. The first helical groove 41 has five left-handed turns (five turns) on the outer circumferential surface of the first pulley 40, and has one end 41a opening out at the rear end surface thereof and another end 41b opening out at the front end surface thereof. The rear end surface and the front end surface of the first pulley 40 are each provided with a first extension groove 42 extending from the corresponding open end of the first helical groove 41. The first extension groove 42 is configured to receive the corresponding part of the cable 10 to fixedly retain the cable 10 by engaging the second engaging end portion 10b of the cable 10. For this purpose, the cross section of the first extension groove 42 is greater at the terminal end thereof than at the side adjoining the first helical groove 41. In particular, the part of the first extension groove 42 having the smaller cross section is dimensioned so as to pass through the main part of the cable 10 but not the first engaging end portion 10a.

The second engaging end portion 10b of the left upper cable 10UL wound around the first helical groove 41 is held in the first extension groove 42 formed in the rear end surface of the first pulley 40. The second engaging end portion 10b of the right upper cable 10UR wound around the first helical groove 41 is held in the first extension groove 42 formed in the front end surface of the first pulley 40. When the slide panel 3 (FIG. 1) is in the closed position, as shown in FIG. 7, the right upper cable 10UR is wound on the first pulley 40 by a larger number of turns than the left upper cable 10UL. Since one of the left and right upper cables 10UL and 10UR is wound and the other upper cable is unwound or paid out in a complementary manner, the total number of turns of the left and right upper cables 10UL and 10UR wound on the first pulley 40 at any moment is always constant.

The front end face of the first pulley 40 serving as a mounting surface therefor is formed with a first recess 43 having a shape complementary to the output shaft 35 of the drive source 5 as indicated by a broken line. In particular, the outer circumferential surface of the output shaft 35 of the drive source 5 is provided with a plurality of axially extending drive side ridges 36 arranged at a regular internal (pitch) in the circumferential direction. In the present embodiment, thirty-two (32) drive side ridges 36 are provided at intervals of 11.25 degrees. Correspondingly, a plurality of axially extending first grooves 44 are formed on the inner circumferential surface of the first recess 43 to receive the corresponding drive side ridges 36. By fitting the drive side ridges 36 into the first grooves 44, the rotation of the first pulley 40 with respect to the output shaft 35 is prevented so that the first pulley 40 is rotationally driven by the drive source 5.

In this manner, the first grooves 44 and the drive side ridges 36 are formed at a regular interval in the circumferential direction. Therefore, after adjusting the rotational angle of the first pulley 40 by increments corresponding to the intervals of the ridges or the grooves (in other words, the amounts of the left and right upper cables 10UL and 10UR wound around the first pulley 40 in the first helical groove 41), the first pulley 40 is fitted onto the output shaft 35 of the drive source 5. Thus, the output shaft 35 and the first recess 43 constitute a simple structure in which the first pulley 40 is spline-coupled to the output shaft 35 of the drive source 5 at a selected relative rotational angle at the time of assembly.

The rear end face of the first pulley 40 is provided with a cylindrical first protrusion 45 projecting rearward along the rotational center line. An outer circumferential surface of the first protrusion 45 is provided with a plurality of axially extending first ridges 46 arranged at a regular interval (pitch) in the circumferential direction. In the present embodiment, thirty-two (32) first ridges 46 are provided at an interval of 11.25 degrees.

FIG. 9 is a rear view of the second pulley 50 shown in FIG. 7 as viewed from the rear or from the mounting side. As shown in FIGS. 7 and 9, a single second helical groove 51 is formed on the outer peripheral surface of the second pulley 50. The second helical groove 51 has five left-handed turns (five turns) on the outer circumferential surface of the second pulley 50, and has one end 51a opening out at the rear end surface and another end 51b opening out at the front end surface. The rear end surface and the front end surface of the second pulley 50 are each provided with a second extension groove 52 extending from the corresponding open end of the second helical groove 51. The second extension groove 52 is configured to fixedly retain the cable 10 by engaging the second engaging end portion 10b of the corresponding cable 10. For this purpose, the cross section of the second extension groove 52 is greater at the terminal end thereof than at the side adjoining the second helical groove 51. In particular, the part of the second extension groove 52 having the smaller cross section is dimensioned so as to pass through the main part of the cable 10 but not the second engaging end portion 10b.

The second extension groove 52 formed on the rear end surface of the second pulley 50 retains the second engaging end portion 10b of the left lower cable 10DL wound around the second pulley 50 in the second helical groove 51. The second engaging end portion 10b of the right lower cable 10DR wound around the second pulley 50 in the second helical groove 51 is held in the second extension groove 52 formed in the front end surface of the second pulley 50. When the slide panel 3 (FIG. 1) is in the closed position, as shown in FIG. 7, the lower cable 10DL on the left side is wound around the second pulley 50 in the second helical groove 51 by a larger number of turns than the lower cable 10DR on the right side. Since one of the left and right lower cables 10DL and 10DR is wound and the other upper cable is unwound or paid out in a complementary manner as the second pulley 50 rotates, the total number of turns of the left and right lower cables 10DL and 10DR wound on the second pulley 50 at any moment is always constant.

The front end surface of the second pulley 50 serving as a mounting surface is provided with a second recess 53 having a complementary shape to the first protrusion 45 (FIG. 8) of the first pulley 40 as indicated by a broken line. In particular, a plurality of axially extending second grooves 54 configured to receive the corresponding first ridges 46 (FIG. 8) are formed on the inner circumferential surface of the second recess 53. By fitting the first ridges 46 into the second grooves 54, the rotation of the second pulley 50 relative to the first pulley 40 is prevented so that the first pulley 40 is rotationally driven by the drive source 5.

In this manner, the second grooves 54 and the first ridges 46 are formed at a regular interval in the circumferential direction. Therefore, after adjusting the rotational angle of the second pulley 50 by increments corresponding to the intervals of the ridges or the grooves (in other words, the amounts of the left and right lower cables 10DL and 10DR wound around the second pulley 50 in the second helical groove 51), the second pulley 50 can be coupled to the pulley 40. Thus, the first protrusion 45 having the first ridges 46 formed on the outer circumferential surface thereof and the second recess 53 having the second grooves 54 formed on the inner circumferential surface thereof jointly constitute a simple structure in which the first pulley 40 and the second pulley 50 are spline-coupled to each other at a selected relative rotational angle at the time of assembly.

The rear end surface of the second pulley 50 is provided with a bearing hole 55 having a bottom and recessed from the rear end surface of the second pulley 50 and centered around the rotational center line, and a cylindrical shaft portion 8a integrally formed in the housing 8 is rotatably fitted into the bearing hole 55. After assembling the first pulley 40 to the output shaft 35 of the drive source, and the second pulley 50 is mounted to the first pulley 40 as discussed earlier, the shaft portion 8a is inserted into the bearing hole 55 of the second pulley 50 to thereby join the rear housing 8B to the front housing 8A. This completes the assembly of the drive source 5.

Owing to the structure of the drive source 5 discussed above, the upper drive cable 10U and the lower drive cable 10D are complementarily wound and unwound in synchronism with each other. Further, the assembling work is facilitated. More specifically, at the time of assembly, the first pulley 40 and the second pulley 50 can be coupled to each other at a desired relative rotational angle, and then joined by using the coupling structure 60 having a simple configuration. In addition, since each cable 10 is retained by the corresponding first pulley 40 or the second pulley 50 via the second engaging end portion 10b without slipping, the upper drive cable 10U and the lower drive cable 10D are not required to be tensioned at the time of assembly, and this also facilitates assembly. In the present embodiment, the first pulley 40 and the second pulley 50 are arranged coaxially with the output shaft 35 of the drive source 5. Therefore, the power slide window 1 can be formed in a compact manner.

Since the slide panel 3 is configured to be slidable in the lateral direction along the panel surface of the window glass pane 2, and in the fore and aft direction crossing the panel surface of the window glass pane 2, the movable glass pane 11 of the slide panel 3 can be disposed within the opening 2a of the window glass pane 2 when in the closed state as shown in FIG. 3. As a result, the unevenness in the panel surface of the window glass pane 2 is minimized, and an aesthetic appearance can be improved so that the commercial acceptability of the power slide window 1 can be improved.

The sliding movement of the slide panel 3 in the lateral direction and in the fore and aft direction is made possible owing to the following configuration. The power slide window 1 includes a window glass pane 2 having an opening 2a, a guide rail 4 provided along the major plane of the window glass pane 2, sliders 20 and 21 provided on the guide rail 4 so as to be slidable along the length of the guide rail 4, a drive source 5 for slidingly driving the sliders 20 and 21, a slide panel 3 that can slide along the guide rail 4 between a closed position where the opening 2a is closed and an open position where the opening 2a is opened, at least one pin 16, 17 projecting from the slide panel 3 in a direction crossing the longitudinal direction of the guide rail 4 and extending along the major plane of the slide panel 3, and a pin guide groove 27 for guiding the at least one pin 16, 17. Further, the pin guide groove 27 includes a groove main portion extending the longitudinal direction of the guide rail 4, and at least one cam groove portion 27a extending from the groove main portion at an angle with respect to the longitudinal direction of the guide rail 4 in such a manner that the at least one cam groove portion 27a approaches the window glass pane 2 as the at least one cam groove portion 27a extends from the groove main portion. The sliders 20 and 21 are provided with at least one elongated slot 30 for driving the at least one pin 16 or 17 inserted therein. This configuration allows the above operation to be accomplished.

The at least one elongate slot 30 extends at an angle to the longitudinal direction of the guide rail 4 so that the transition from the lateral sliding movement to the fore and aft movement by the slide panel 3 can be accomplished in a smooth manner.

Although the present invention has been described in terms of a concrete embodiment, the present invention is not limited to the above-described embodiment, but can be modified in various ways. For example, the power slide window 1 was applied to the rear window of a pickup truck as an example in the above embodiment, but may also be applied to a rear window or a side window of a minivan or the like. The first protrusion 45 was formed in the first pulley 40 and the second recess 53 was formed in the second pulley 50 in the above embodiment, but the recess may be formed in the first pulley 40 while the protrusion is formed in the second pulley 50. Further, the axially extending ridges formed in the outer circumferential surface of the protruding portion are not limited to those having a length corresponding to the grooves as is the case with the first ridges 46, but may be any protrusions protruding so as to fit into the grooves. Also, the various structures, positions, numbers and angles of the various members and portions may be freely modified without departing from the spirit of the present invention. The various components of the illustrated embodiment are not necessarily essential for the present invention, but can be selectively omitted without departing from the spirit of the present invention.

Glossary of Terms

| | | | |
|---|---|---|---|
| 1 | power slide window | 2 | window glass pane |
| 2a | opening | 3 | slide panel |
| 4 | guide rail | 5 | drive source |
| 10 | cable | 10D | lower drive cable |
| 10DL | left lower cable | 10DR | right lower cable |
| 10U | upper drive cable | 10UL | left upper cable |
| 10UR | right upper cable | | |
| 10a | first engaging end portion (one end) | | |
| 10b | second engaging end portion (other end) | | |
| 35 | output shaft | 36 | drive side protrusion (protrusion) |
| 40 | first pulley | 43 | first recess |
| 44 | first groove | 45 | first protrusion |
| 46 | first ridge (projection) | 50 | second pulley |
| 53 | second recess | 54 | second groove |
| 60 | coupling structure | | |

The invention claimed is:

1. A power slide window, comprising:
a window glass pane having an opening formed therein;
a slide panel slidably provided on the window glass pane so as to open and close the opening;
a drive source for slidingly driving the slide panel;
an upper drive cable connected to an upper part of the slide panel and extending from the slide panel in a lateral direction along a panel surface of the window glass pane;
a lower drive cable connected to a lower part of the slide panel and extending from the slide panel in the lateral direction along the panel surface of the window glass pane;
a first pulley configured to be rotatably driven by the drive source to wind and unwind the upper drive cable, the first pulley having an outer circumferential surface, a rear end surface and a front end surface;
a second pulley configured to be rotatably driven by the drive source to wind and unwind the lower drive cable, the second pulley having an outer circumferential surface, a rear end surface and a front end surface; and
a coupling structure configured to join the first pulley and the second pulley to each other at a relative angular relationship selected at a time of assembly;
wherein the outer peripheral surface of the first pulley is provided with a single first helical groove having one end opening out at the rear end surface and another end opening out at the front end surface, the rear end surface and the front end surface of the first pulley are each provided with a first extension groove extending from the corresponding open end of the first helical groove, the outer peripheral surface of the second pulley is provided with a single second helical groove having one end opening out at the rear end surface and another end opening out at the front end surface, and the rear end surface and the front end surface of the second pulley are each provided with a second extension groove extending from the corresponding open end of the second helical groove,
wherein the upper drive cable includes a pair of upper cables, and the lower drive cable includes a pair of lower cables, the upper cables and the lower cables being each provided with one end connected to a corresponding lateral end of the slide panel, and another end connected to a corresponding one of the first extension grooves of the first pulley and the second extension grooves of the second pulley, and
wherein the first pulley is configured to wind and unwind the two upper cables in a mutually complementary manner while the second pulley is configured to wind and unwind the two lower cables in a mutually complementary manner.

2. The power slide window according to claim 1, wherein the coupling structure includes a recess formed in one of the end surfaces of one of the first pulley and the second pulley, the recess having a plurality of axial grooves formed on an inner circumferential surface thereof, and a protrusion protruding from one of the end surfaces of another of the first pulley and the second pulley in a complementary relationship to the recess, the protrusion having a plurality of projections formed on an outer circumferential surface thereof and configured to be received by the respective grooves.

3. The power slide window according to claim 2, wherein the first pulley and the second pulley are disposed coaxially to an output shaft of the drive source.

4. The power slide window according to claim 3, wherein the first pulley or the second pulley is configured to be coupled to the output shaft of the drive source at a relative angular relationship selected at a time of assembly.

5. The power slide window according to claim 4, wherein the other of the first pulley and the second pulley is provided with a recess formed in another of the end surfaces thereof, the recess having a plurality of axial grooves formed on an inner circumferential surface thereof, and the output shaft of the drive source has a shape complementary to the recess and is provided with a plurality of projections formed on an outer circumferential surface thereof and configured to be received by the respective grooves.

6. The power slide window according to claim 1, wherein the slide panel is slidably guided in the lateral direction along the panel surface of the window glass pane and in a fore and aft direction crossing the panel surface of the window glass pane.

* * * * *